United States Patent
Garrett et al.

(10) Patent No.: US 6,513,102 B2
(45) Date of Patent: *Jan. 28, 2003

(54) INTERNAL COPY FOR A STORAGE CONTROLLER

(75) Inventors: Brian Garrett, Hopkinton, MA (US); Haim Kopylovitz, Brookline, MA (US); Hana Moreshet, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/135,070

(22) Filed: Apr. 30, 2002

(65) Prior Publication Data
US 2002/0124138 A1 Sep. 5, 2002

Related U.S. Application Data

(62) Division of application No. 09/041,401, filed on Mar. 12, 1998, now Pat. No. 6,408,369.

(51) Int. Cl.[7] .............................................. G06F 12/00
(52) U.S. Cl. ....................................... 711/165; 711/113
(58) Field of Search ................................ 711/162, 165, 711/112, 113, 114

(56) References Cited

U.S. PATENT DOCUMENTS

| | | | | |
|---|---|---|---|---|
| 4,506,323 A | * | 3/1985 | Pusic et al. ................. 711/161 |
| 5,341,493 A | * | 8/1994 | Yanai et al. ................. 711/161 |
| 5,418,763 A | * | 5/1995 | Ichikawa et al. ............. 369/84 |
| 5,544,347 A | * | 8/1996 | Yanai et al. ................. 711/162 |
| 5,581,740 A | * | 12/1996 | Jones ........................... 703/25 |
| 5,615,330 A | * | 3/1997 | Taylor ............................ 714/7 |
| 5,781,908 A | * | 7/1998 | Williams et al. ............. 709/223 |
| 5,787,487 A | * | 7/1998 | Hashimoto et al. .......... 711/165 |
| 5,829,045 A | * | 10/1998 | Motoyama ................... 711/162 |
| 5,835,954 A | * | 11/1998 | Duyanovich et al. ........ 711/162 |
| 6,230,239 B1 | * | 5/2001 | Sakaki et al. ................ 711/112 |
| 6,408,369 B1 | * | 6/2002 | Garrett et al. ............... 711/162 |

* cited by examiner

*Primary Examiner*—Hiep T. Nguyen
(74) *Attorney, Agent, or Firm*—John M. Gunther; Penelope S. Wilson

(57) ABSTRACT

A storage system has a storage controller connected to a plurality of storage devices. The described system and method transfer physical data from a first storage device to a second storage device. The method does not involve a host computer in the physical data transfer thereby saving both computer CPU time and system bandwidth. The method receives an internal copy command from a commanding processor (the host) over a controller input path, reads at least one block of data, in data block format, from the first storage device, stores the requested data in a volatile memory in the controller, and sets a state of the pending stored data as a write pending state. The controller then destages the write pending memory stored data to the second storage device.

12 Claims, 4 Drawing Sheets

INTERNAL COPY FOR A STORAGE CONTROLLER

This application is a divisional of U.S. patent application Ser. No. 09/041, 401 now U.S. Pat. No 6,408,368 filed Mar. 12, 1998, which is herein incorporated by reference in its entirety.

BACKGROUND OF THE INVENTION

The invention relates generally to the transfer of data from one storage element to another, and more particularly, to a method and apparatus for reducing host computer involvement in the transfer operation.

As host computers become more and more powerful, as well as more complex, it is important to maintain the primary focus of the host computer on activities other than peripheral data handling. In particular, in a copy or transfer from one disk drive unit to another, the host computer can, and will, spend a considerable time simply reading data from one disk drive unit into its own-memory and then writing the data from its own memory to a second disk drive unit. This activity can occupy not only substantial host computer CPU cycles but, in addition, substantial amounts of bus bandwidth. Such a resource use is especially intrusive if the bus bandwidth is low or small, or, if the transfer rate from the disk drive controller is high.

Thus, in addition to freeing up CPU time at the host computer, it is desirable to reduce the data transfer activity from a disk drive controller to the host computer, leaving the communications channel available for other operations. When a SCSI bus is used, other peripherals on the bus can then be given considerably greater access to the bus.

SUMMARY OF THE INVENTION

The invention relates to a storage system which has a storage controller connected to a plurality of storage devices. The invention of the system and method features operating the system to transfer physical data from a first storage device to a second storage device. The method does not involve the host computer in the physical data transfer thereby saving both computer CPU time and system bandwidth. The method features receiving an internal copy command from a commanding processor over a controller input path, reading at least one block of data, in data block format, from the first storage device, storing the requested data in a volatile memory in the controller setting a state of the pending stored data as a write pending state, and destaging the write pending memory stored data to the second storage device.

The storage system, according to the invention, features a storage controller having a cache memory, at least one input port and at least a first and a second output port. The system further features a control processor connected to the at least one input port and two output ports. The at least two output ports connect to storage devices. The controller receives a transfer command from the outside source at the input port. The control processor responds to the transfer command by reading blocks of data specified in the command from a storage device connected to the first output port and storing the read data in the cache memory. The control processor associates a write pending flag with the stored read data. The control processor further destages the stored read data blocks to a storage device connected to the second output port.

In a particular aspect, the invention relates to a system for transferring data from a first storage device, accessible to a first command processor, to a second storage device accessible to a second command processor but not necessarily the first. In this aspect of the invention, the transfer is made internally of the storage controller rather than requiring the command processors to communicate directly with each other. Advantageously, this allows processors using different operating systems, otherwise incompatible with each other, to easily and quickly transfer data therebetween without the need for each of the command processors to be tied up in the physical transfer of the data.

The invention, thereby, advantageously provides a command processor or host computer with the additional selected ability to transfer data without itself being involved in the physical transfer process. In addition to saving computer time, bus transfer bandwidth is also made available for other devices. In particular aspects of the invention, otherwise incompatible processors are able to transfer data between storage devices to which they would otherwise not have access.

BRIEF DESCRIPTION OF THE DRAWING

Other objects, features, and advantages of the invention will be apparent from the following description taken together with the drawings in which.

DESCRIPTION OF A PARTICULAR EMBODIMENT OF THE INVENTION

Figure 1:
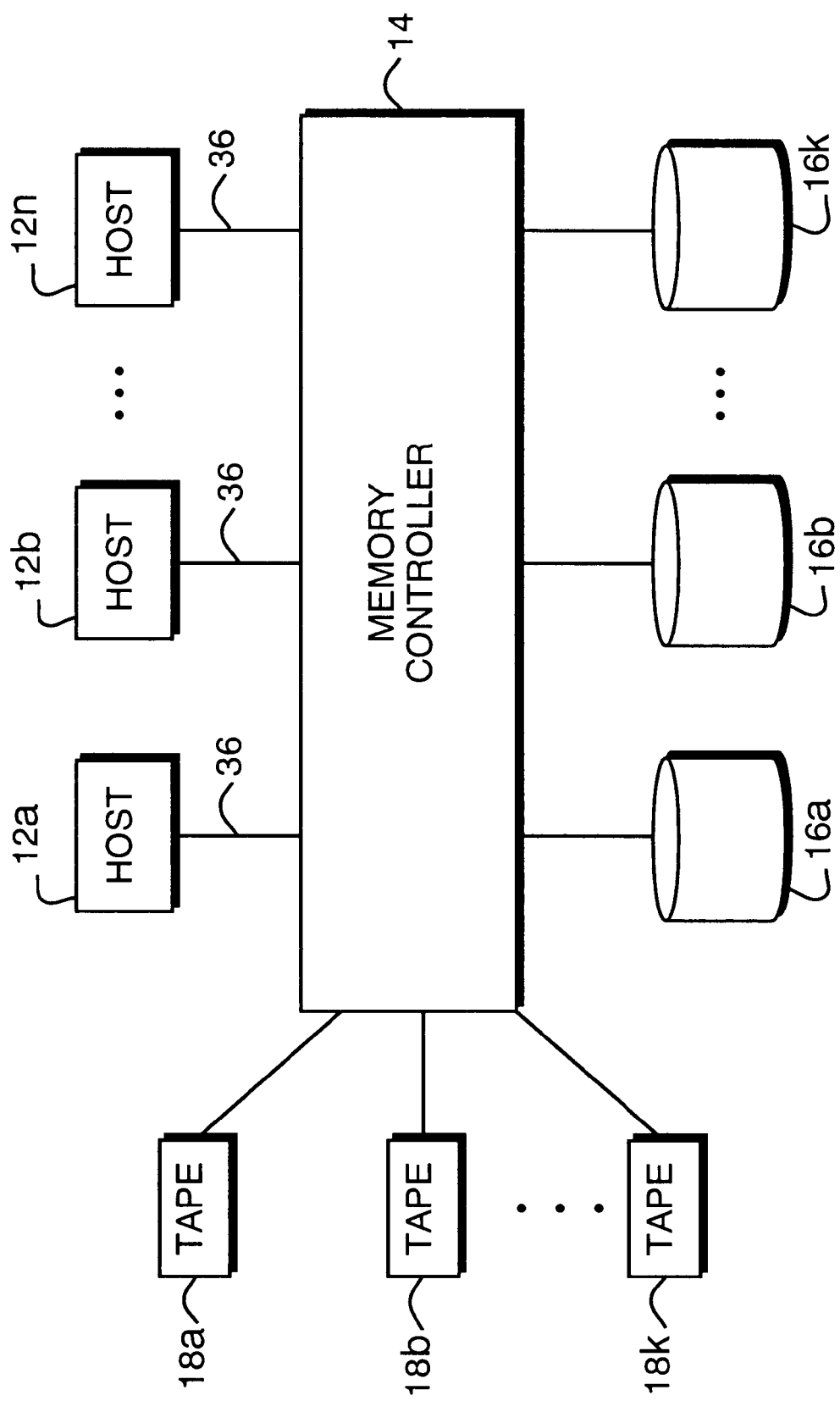
FIG. 1 is a block diagram of a typical computer storage system in which the invention is particularly useful.

Referring to FIG. 1, the invention relates to a computer system wherein at least one, and more likely a plurality of hosts 12a, 12b, . . . , 12n, connect to a storage controller system 14, such as the EMC Symmetrix disk array storage system. The storage controller 14 acts as the interface between the host computers and a plurality of mass storage devices, such as, for example, disk drives 16a, 16b, . . . , 16k. Data written by the host or read from the disk drive elements pass through the storage controller system which acts as a two way communications path with substantial capabilities. For example, in some systems, the data from the host are uniformly striped across all of the disk storage devices; and in other systems, the data from the host are stored on the disk drives 16 according to a RAID protocol. In yet other embodiments of the invention, all of the data from a particular host can be stored on a single disk drive or in different logical volumes of the same or different disk drives, depending upon the nature and the source of the data and host. A host computer can also read data from one or more, but not necessarily all, of the disk drive units.

When a problem arises which impairs performance of the system, for example, a decrease in throughput, the problem can arise from simple operations performed by the host such as a large transfer or copying of data from one drive to another. Typically, in prior systems, the host would read the data from the drive, through the storage controller, and then write the data, through the same or a different controller to a second disk drive. This process uses substantial amounts of CPU time and bus bandwidth, as well as host memory.

Figure 2:
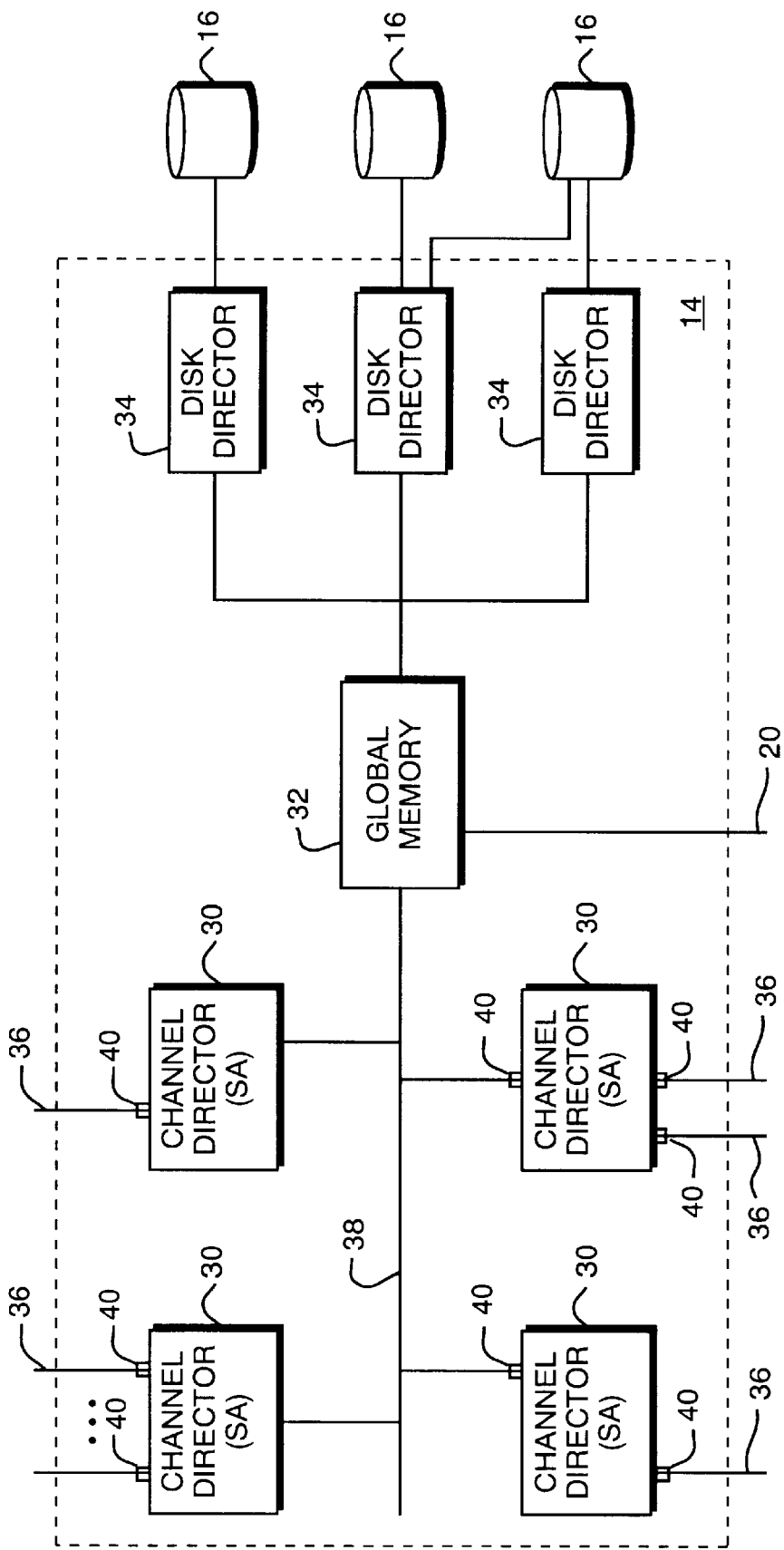
FIG. 2 is a more detailed block diagram of a storage system in which the invention finds particular use.

Referring to FIG. 2, in a particular embodiment according to the invention, the disk controller is configured to have a plurality of channel directors 30 (most often referred to a SCSI adapters (or SA's) when operating according to a SCSI protocol or fibre adapters when operating according to a fibre channel protocol) connecting to a global memory 32 through which all data and commands flow. The global memory 32 is connected to a plurality of disk directors 34 (typically SCSI adapters) which connect to the disk drives 16. In accordance with this particular embodiment of the invention, each channel director operates over channels 36 and 38 using a SCSI protocol. Each channel director 30 can be connected to one or more host computers over buses 36 (typically, one host I/O controller per port 40).

Figure 3:
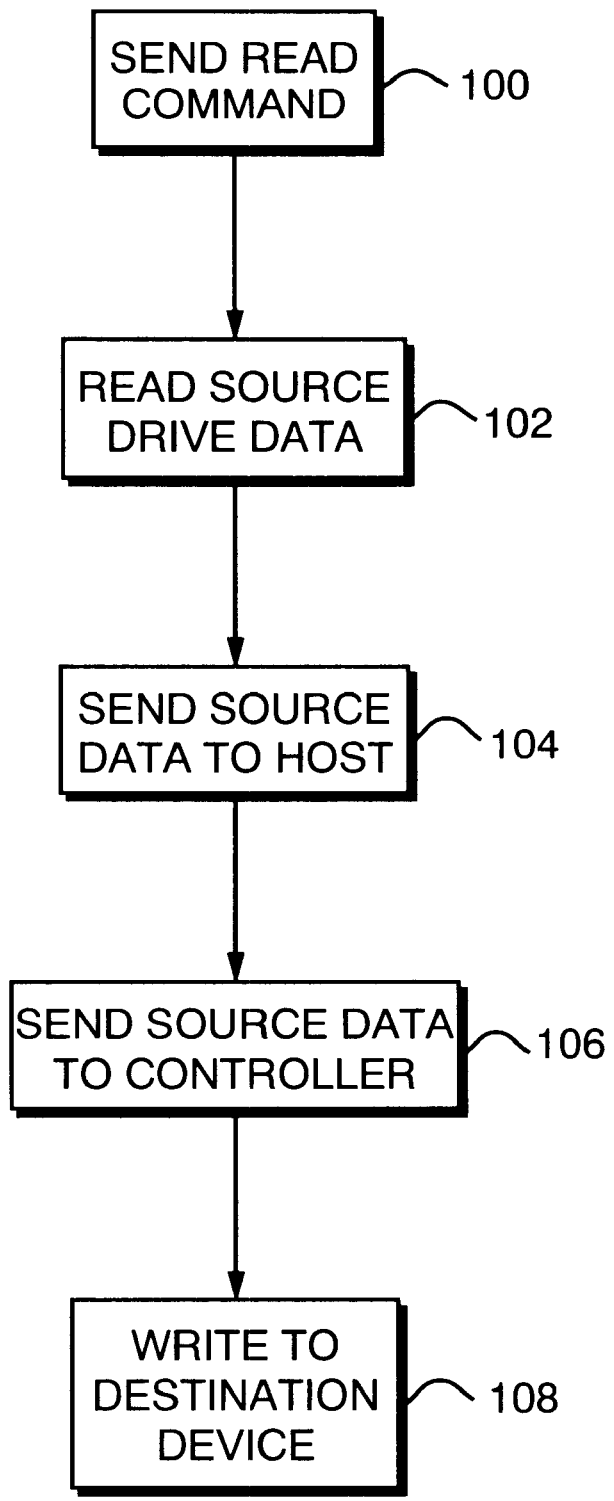
FIG. 3 is a flow chart in accordance with a prior method of operation.

Thus, referring to FIG. 3, in prior systems, a data copy, from one storage element to another, is initiated when, the host computer sends a read command (step 100) over, for example, the SCSI bus or a fiber channel bus 36 to the SCSI adapter or fiber channel adapter contained within the disk drive controller. In the Symmetrix controller, the system takes the command from the SCSI adapter or the fiber channel adapter, and causes the disk adapter to read (step 102) the data from the drive, typically over a SCSI bus 42. The data is then sent back (step 104) to the host computer over the SCSI channel or fiber channel 36 and is stored at the host. The host computer then sends the data back to the controller (step 106), including, this time the identification of the destination disk drive. The controller completes the data transfer (step 108) by writing to the destination device.

Figure 4:
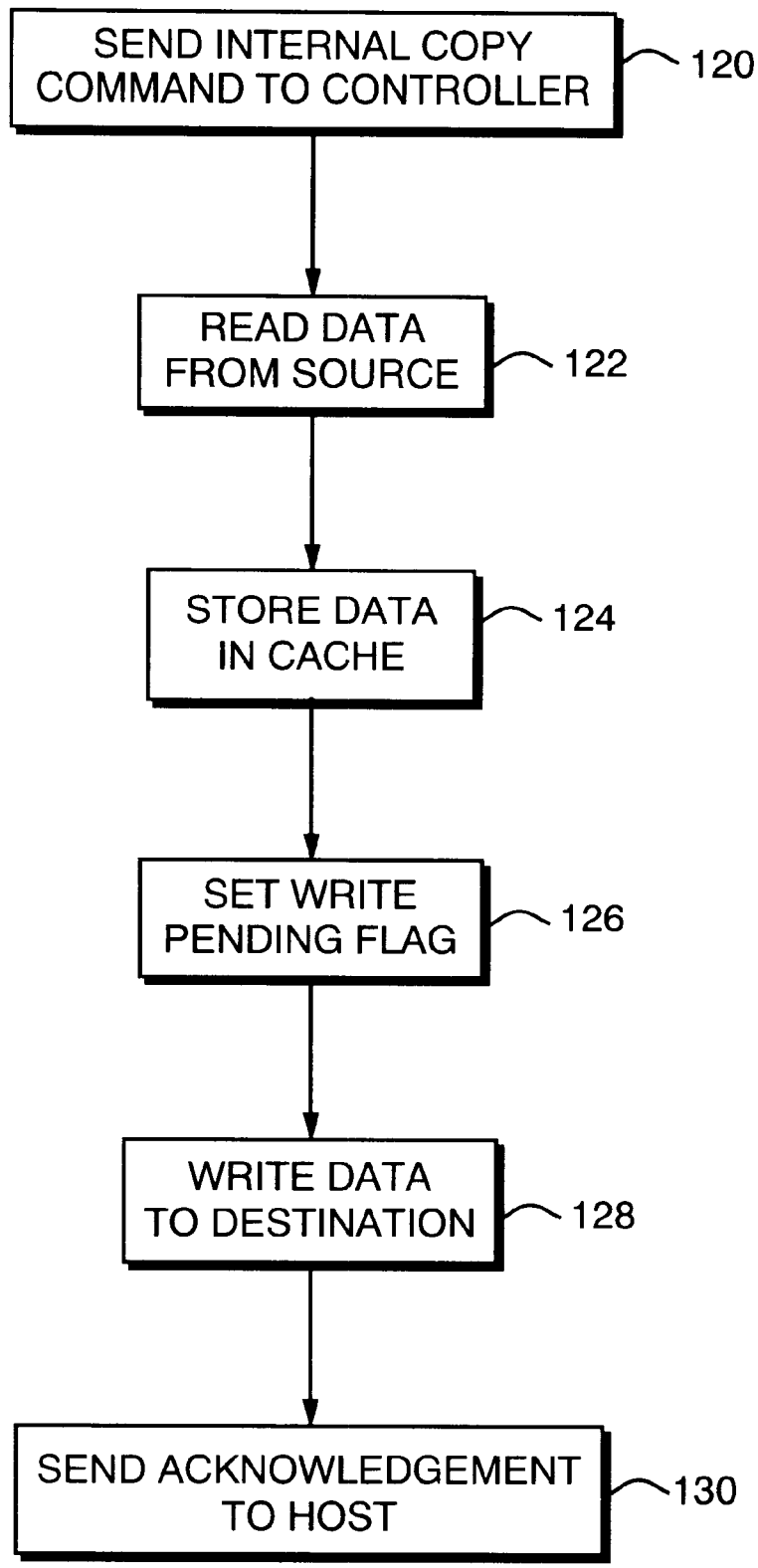
FIG. 4 is a flow chart in accordance with the operation of the invention.

Referring to FIG. 4, in operation according to the illustrated embodiment of the invention, a host computer issues a command (step 120) to the disk drive controller, in the illustrated embodiment a Symmetrix controller, which commands that the drive controller read data blocks from one disk drive unit (the source unit) and write them to another disk drive unit (the destination unit). The data blocks can be less than a full track of data, and can start at any offset from the beginning of a track. In practice, the disk drive controller first reads the required data (step 122) from the drive unit and places or stores it (step 124) in a shared cache (global memory 32) in the controller. The data is labeled "write pending" to the destination device. Thereafter, the controller, with the data stored in its cache, and labeled as write pending data (step 126), writes the data (step 128) to the second disk drive element. The host computer receives (step 130) an affirmative (or negative if appropriate) response from the controller as to whether or not the internal copy data operation has been completed. It is also important to note that in these disk operations, the host computer need not have access itself to the destination disk drive. Accordingly, not only is the host not involved in the actual physical transfer of the data on a byte by byte process (which would utilize substantial host computer CPU time), but the busses connecting the host computer to the disk drive controller are also not used and remain free for other operations.

According to the preferred embodiment of the invention, the host computer sends a system command over a to channel, the SCSI channel or the fiber channel, to the SCSI adapter or fiber adapter respectively, of the controller at step 120. In response, the controller issues the command to the disk adapter to read the source data, typically and preferably in blocks, from the source disk drive. In accordance with the invention, the data is stored in cache memory within the controller, setting a write pending flag. As the result, therefore, the controller when it can write to the selected destination, will write that stored data to the selected destination disk drive and completes the operation. The controller then, in response to the host computer system transfer command, sends a command completed signal over the connecting channel.

If, for some reason, the system transfer command cannot complete, the controller returns a "command not completed" back to the host computer (at step 130) and the host computer can either try the operation again, or transfer the data using a "prior art" command sequence.

Additions, subtractions, and other modifications of the disclosed invention will be apparent to those practiced in this field and are within the scope of the following claims.

What is claimed is:

1. A system including at least one command processor, and a storage subsystem comprising a plurality of disk drives organized into tracks that contain data, and a storage controller connected to the command processor and the plurality of disk drives and providing a read and write communication path between the command processor and at least some of the plurality of disk drives, the storage controller being responsive to commands from the command processor to transfer one or more identified blocks of data from an identified source disk drive from the at least some of the plurality of disk drives having read and write access to the command processor through the storage controller to an identified destination disk drive from among the plurality of disk drives by transferring the data independent of the command processor, the storage controller comprising:

a cache memory, at least one input port, a plurality of output ports, each connected to and corresponding with at least one of the plurality of disk drives, a control processor connected to the at least one input port and to the output ports, the control processor receiving the transfer command from the command processor at the input port, the control processor responding to the transfer command by reading one or more blocks of data specified in the transfer command from the identified source disk drive through its corresponding output port and storing the read data in the cache memory, and the control processor destaging the stored read data blocks from cache memory to the identified destination disk drive through its corresponding output port.

2. A system according to claim 1 wherein any block of data read in response to the transfer command may comprise less than a full track of data and may start at an offset from the beginning of the track.

3. A system according to claim 1 wherein the control processor associates a write pending flag with the read data upon storing it in cache memory.

4. A system according to claim 1 wherein the control processor destaging the stored read data blocks from cache memory to the identified destination disk drive includes attempting to destage the stored read data blocks from cache memory to the destination disk drive and returning a command completed signal to the command processor if the attempt is successful and returning a command not completed signal to the command processor if the attempt is not successful.

5. In a system including at least one command processor, a storage subsystem comprising a plurality of disk drives organized into tracks that contain data, and a storage controller connected to the command processor and the plurality of disk drives and providing a read and write communication path between the command processor and at least some of the plurality of disk drives, the storage controller being responsive to commands from the command processor to transfer one or more identified blocks of data from an identified source disk drive from the at least some of the plurality of disk drives having read and write access to the command processor through the storage controller to an identified destination disk drive from among the plurality of disk drives by transferring the data independent of the command processor, the storage controller comprising:

a cache memory, at least one input port, a plurality of output ports, each connected to and corresponding with at least one of the plurality of disk drives, a control processor connected to the at least one input port and to the output ports, the control processor receiving the transfer command from the command processor at the input port, the control processor responding to the transfer command by reading one or more blocks of data specified in the transfer command from the identified source disk drive through its corresponding output port and storing the read data in the cache memory, and the control processor destaging the stored read data blocks from cache memory to the identified destination disk drive through its corresponding output port.

6. A storage subsystem according to claim 5 wherein any block of data read in response to the transfer command may comprise less than a full track of data and may start at an offset from the beginning of the track.

7. A storage subsystem according to claim 5 wherein the control processor associates a write pending flag with the read data upon storing it in cache memory.

8. A storage subsystem according to claim 5 wherein the control processor destaging the stored read data blocks from cache memory to the identified destination disk drive includes attempting to destage the stored read data blocks from cache memory to the destination disk drive and returning a command completed signal to the command processor if the attempt is successful and returning a command not completed signal to the command processor if the attempt is not successful.

9. In a system including at least one command processor and a plurality of disk drive storage devices organized into tracks that contain data, a storage controller connected to a command processor and the plurality of disk drives and providing a read and write communication path between the command processor and at least some of the plurality of disk drives, the storage controller being responsive to commands from the command processor to transfer one or more identified blocks of data from an identified source disk drive selected from the at least some of the plurality of disk drives having read and write access to the command processor through the storage controller to an identified destination disk drive selected from among the plurality of disk drive storage devices by transferring the data independent of the command processor, the storage controller comprising:

a cache memory, at least one input port, a plurality of output ports, each connected to and corresponding with at least one of the plurality of disk drive storage devices, a control processor connected to the at least one input port and to the output ports, the control processor receiving the transfer command from the command processor at the input port, the control processor responding to the transfer command by reading one or more blocks of data specified in the transfer command from the identified source disk drive through its corresponding output port and storing the read data in the cache memory, and the control processor destaging the stored read data blocks from cache memory to the identified destination disk drive through its corresponding output port.

10. A storage controller according to claim 9 wherein any block of data read in response to the transfer command may comprise less than a full track of data and may start at an offset from the beginning of the track.

11. A storage controller according to claim 9 wherein the control processor associates a write pending flag with the read data upon storing it in cache memory.

12. A storage controller according to claim 9 wherein the control processor destaging the stored read data blocks from cache memory to the identified destination disk drive includes attempting to destage the stored read data blocks from cache memory to the destination disk drive and returning a command completed signal to the command processor if the attempt is successful and returning a command not completed signal to the command processor if the attempt is not successful.

* * * * *